Oct. 20, 1959  C. P. SPAULDING  2,909,769
CODE COMPARISON AND CONTROL SYSTEM
Filed Nov. 7, 1955  2 Sheets-Sheet 1
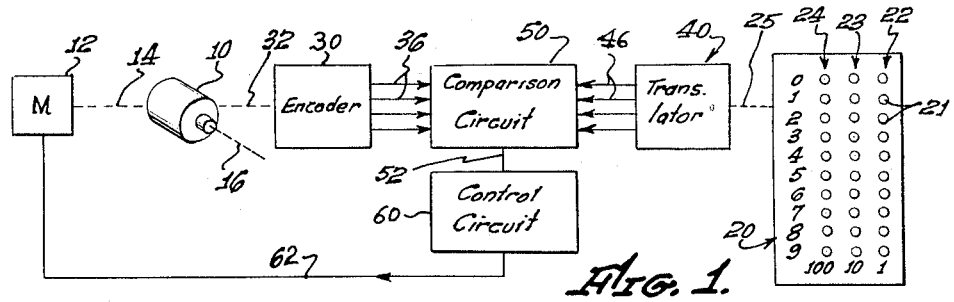
Fig. 1.
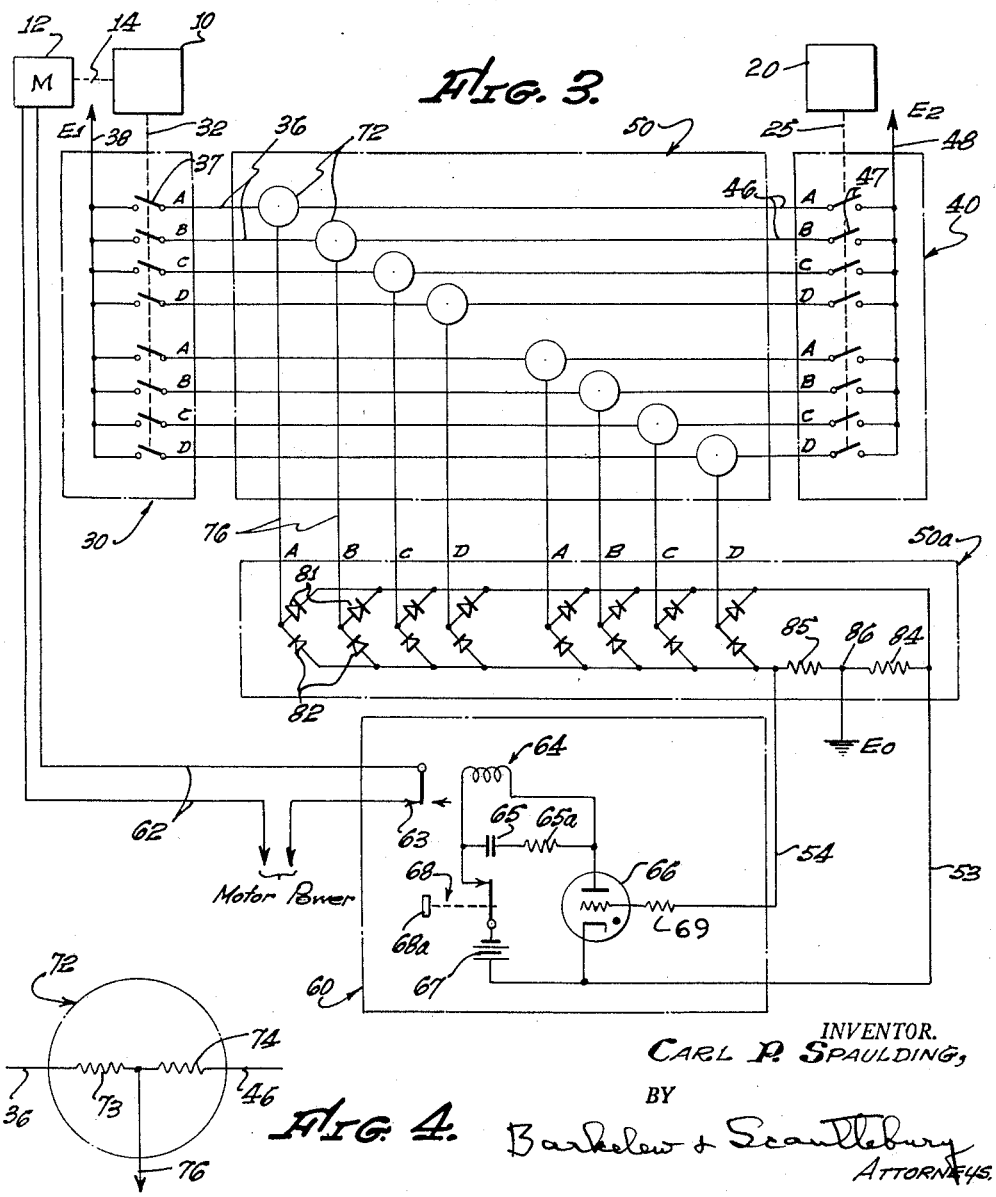
Fig. 3.
Fig. 4.
INVENTOR.
CARL P. SPAULDING,
BY
Barkelew & Scantlebury
ATTORNEYS.

United States Patent Office 2,909,769
Patented Oct. 20, 1959

2,909,769

CODE COMPARISON AND CONTROL SYSTEM

Carl P. Spaulding, San Marino, Calif., assignor, by mesne assignments, to Datex Corporation, Monrovia, Calif., a corporation of California Application November 7, 1955, Serial No. 545,425

2 Claims. (Cl. 340—347)

This invention has to do with means for positioning a member in accordance with information presented in digital form. The invention provides a system for producing code representations of the actual member position and of the desired position, both representations being expressed in terms of a common code, and for comparing the two code representations to derive a control signal for deriving the member.

In accordance with one aspect of the invention, both the actual position of the member and an Arabic number representing the desired position are expressed in terms of a binary code, and those two binary code representations are compared by a comparison circuit of particularly simple and economical type. An important characteristic of that comparison circuit is that each code element of one representation is compared directly with the corresponding code element of the other representation, and a signal is developed which represents the result of that comparison. The resulting signals for the several code elements are then utilized to develop a single output signal that indicates whether or not the two representations correspond with respect to all of the code elements.

In the particular preferred embodiment of the invention to be described, a signal line is associated with each pair of corresponding code elements of the two representations, and the relationship of the code elements of each pair is represented by the circuit condition of the corresponding signal line. In particular, one or another of two distinct voltages may be supplied to the line if the two code elements are unlike, and a definite intermediate voltage may be supplied to the line, or the line may be opened, if the two code elements are like. The resulting signals are then supplied to a discriminating circuit that reacts in one manner if any input voltage has a value different from the intermediate value, and reacts in another way only if all signal lines are open or carry the said intermediate voltage. The output of that discriminating circuit indicates the relationship of the two representations. It may be employed in any desired manner to control means for driving the member that is to be positioned. The described type of comparison system is particularly suitable for controlling a drive motor which, for example, drives the member continuously through its entire range of positions until the desired position is reached, the motor then being de-energized in response to coincidence of the two code representations.

In developing a binary code representation of the actual position of the member, it is convenient to utilize a code of the type known as cyclic or monostrophic. In cyclic codes only one code element changes value at a time, completely avoiding the need for additional instrumentation to insure that, whenever two code elements are supposed to change at the same time, one does not change before the other.

A further aspect of the invention provides means for translating digital information initially presented in terms of ordinary Arabic numbers, for example by manual operation of a decimal keyboard, into cyclic binary code. That aspect of the invention preferably utilizes a cyclic binary code of the type in which the several Arabic digits are represented by respective groups of binary code elements; in which different code element configurations are employed to represent any digit value when the preceding decimal digit is odd and when the preceding decimal digit is even; and in which those two configurations for each digit value differ only in the state of a single code element. A characteristic of such codes is that the configuration representing any digit value when the preceding Arabic digit is odd can be changed into the configuration representing the same digit value when the preceding Arabic digit is even by inverting the state of that one code element.

A full understanding of the invention and of its further objects and advantages will be had from the following description of a preferred embodiment, of which description the accompanying drawings form a part. That description and all particulars of the structure to which it pertains are intended for illustration of the invention, and not as a limitation upon its scope, which is defined in the appended claims.

In the drawings:

Fig. 1 is a schematic block diagram representing an illustrative preferred embodiment of the invention;

Fig. 2 is a schematic diagram representing an illustrative keyboard and code translating mechanism controlled thereby;

Fig. 3 is a schematic diagram representing further illustrative features of a system in accordance with Fig. 1; and Fig. 4 is a fragmentary schematic diagram representing illustrative structure for portions of Fig. 3.

An illustrative system in accordance with the invention is shown in block form in Fig. 1. A movable member is indicated at 10, with driving means for the member shown illustratively as an electric motor 12. A driving connection between motor 12 and member 10 is indicated by the dashed line 14, and may include speed reduction, clutch and braking mechanism of any suitable type. Member 10 may be movable in any convenient manner, being represented for the purposes of illustration as a body rotatable about an axis 16. The position of member 10, for example its angular position about that axis, may be represented in many ways in terms of a number. For example, the continuum of possible angular positions may be divided into 360 numbered regions, commonly referred to as degrees, or into 1000 numbered regions, commonly referred to as mils. The number of that region in which the actual position of the member lies then provides a numerical representation of the member position. If it is desired to represent the member position more accurately, the total range of member movement may be divided into a larger number of regions.

A primary object of the present invention is to provide a system for designating a member position in digital form, and for determining whether or not the actual member position corresponds to the position so designated. Such a system may include means for automatically driving the member to the designated position. In Fig. 1 a position-designating means is shown schematically at 20 in the illustrative form of a decimal keyboard, comprising thirty keys 21 arranged in three sets of ten keys each. The three sets of keys 22, 23, and 24, correspond to the three decimal digits commonly denoted as units, tens and hundreds, respectively, as indicated at the bottom of the box 20. Each set includes one key for each of the ten values that the corresponding digit may assume, as indicated at the left of the box 20. Hence any internal number less than 1000 can be designated by pressing the three corresponding keys, one in each set. Needless to say, additional sets of keys may be provided as desired, the representation of three sets corresponding to three decimal digits being illustrative. Furthermore, if it should be desired to designate member positions in terms of a number system other than ordinary Arabic numerals, more or fewer keys may be provided in each set, one key being provided for each value that the corresponding digit may assume. The output from device 20 is represented schematically by the dashed line 25 in Fig. 1, and may comprise an electrical or mechanical signal transmission system of any suitable type responsive to the detailed condition of the number designating device. For example, signal 25 may comprise the positions of levers connected to the respective keys 21.

In accordance with the invention, means are provided for representing the actual position of member 10 in terms of a definite binary code, and means are also provided for representing the position designated by the device 20 in terms of the same binary code. In Fig. 1 an encoder is indicated schematically at 30, mechanically linked to member 10, as indicated by the dashed line 32. Encoder 30 may be any suitable type of device for producing a binary code representation of the position of member 10. Such a code typically utilizes a number of physical code elements that are respectively capable of two alternative conditions. For example, each code element may comprise an electric circuit that may be either open or closed. The lines 36 in Fig. 1 represent such code circuits, of which any required number may be provided. The conditions of the several code elements may be controlled automatically in response to member movement by known mechanisms of many different types. For example, the code elements may be controlled by means of a commutator driven with the member and having a brush corresponding to each code element, the commutator surface comprising areas of conductive and non-conductive material arranged along the path of each brush in accordance with a definite code. Any position of member 10 then leads to a definite configuration of open and closed circuit conditions among the code elements; that configuration representing the member position in accordance with the selected code.

As already indicated, it is preferred to utilize for the purpose just described a binary code that is cyclic, for which the configurations of code element conditions that correspond to two adjacent positions of member 10 differ in the condition of just one code element. However, many of the advantages of the invention may be obtained also with other types of binary code.

Figure 2:
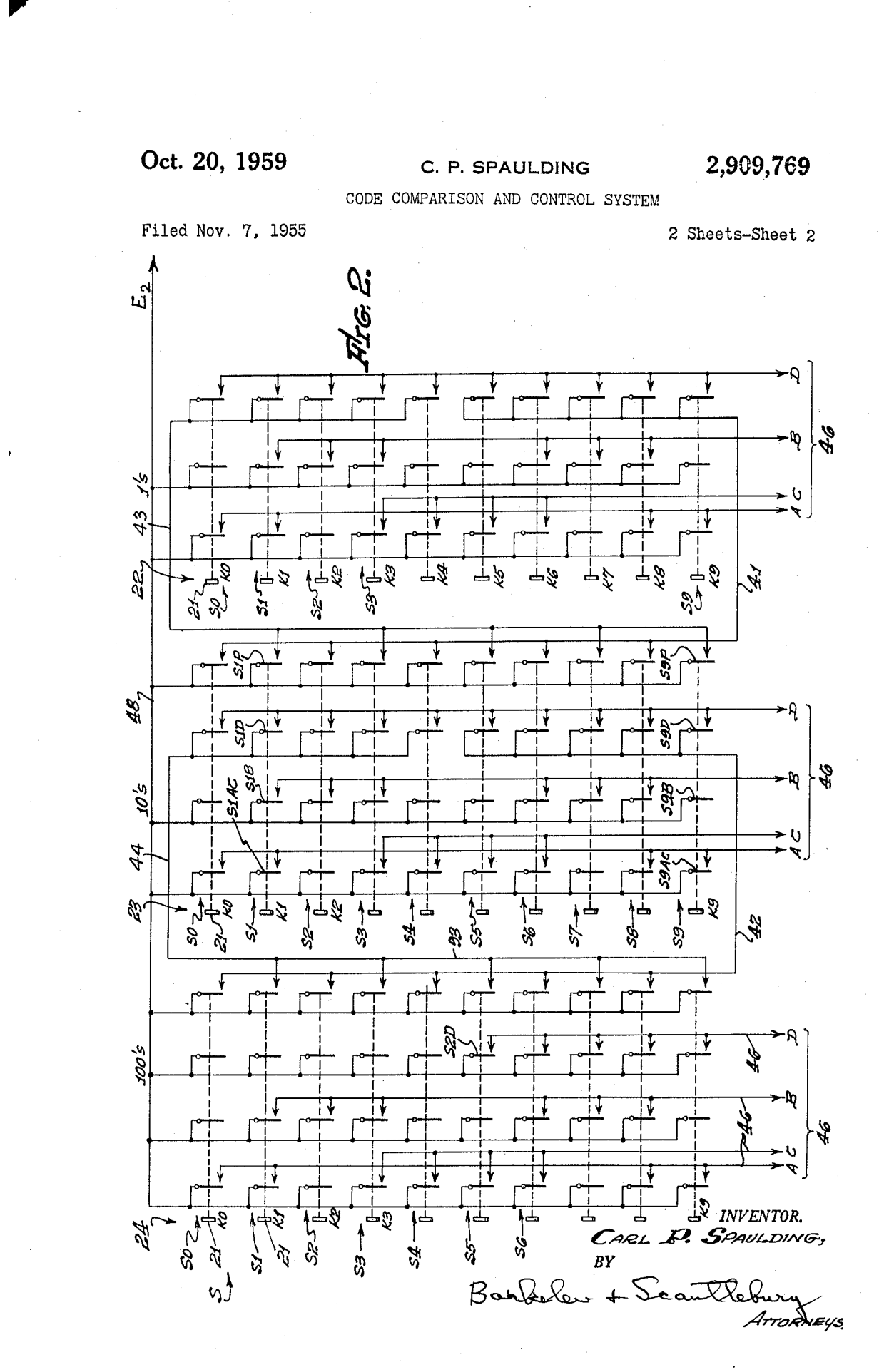

In order to obtain a cyclic binary code representation of the decimal number designated by device 20, which represents typically a selected position for member 10, a code translator 40 may be employed. Translator 40 is controlled by signal 25 from device 20 and acts, in the present embodiment, to open and close certain of the code circuits indicated at 46 to produce a code representation of the decimal number designated by keyboard 20 in terms of the same code utilized by encoder 30. Fig. 2 shows illustrative details of a translator 40, which may be mechanically integrated with mechanism 20. The code elements represented by circuits 36 and by circuits 46 thus pertain to the same code, so that there is a one-to-one correspondence between the several code elements of the respective groups. When the position of member 10 corresponds to the number designated on keyboard 20, the configuration of states of all code elements 36 and the configuration of states of all code elements 46 will therefore be identical. Otherwise they will be different, that difference sometimes involving only one code element of each group, and sometimes involving several such elements.

In accordance with the invention, particularly simple and economical means are provided for distinguishing between identical code configurations at 36 and 46, on the one hand, and different code configurations at 36 and 46, on the other hand. Such distinguishing means are shown schematically as a single box 50 in Fig. 1, and are shown in further illustrative detail in Figs. 3 and 4. An output signal from comparison circuit 50 is provided on line 52 to a suitable control circuit, indicated schematically at 60, which may be of conventional type, and which acts to control the motor 12 via the line 62 in accordance with the signal 52. Control circuit 60 typically causes motor 12 to drive member 10 when signal 52 corresponds to unlike code configurations at 36 and 46, and stops the motor in response to a signal 52 corresponding to like configurations. The motor may, for example, be brought to a stop substantially instantaneously by suitable braking means; or the motor may be permitted a uniform amount of overrun, which may be provided for by suitably phasing the rotary positions of member 10 and of connection 32 to encoder 30.

A preferred illustrative cyclic code of binary coded decimal type is shown in the accompanying table, in which the symbol $x$ typically represents closed condition of a code element circuit, and the symbol $o$ represents open condition. Binary code representations are shown for the decimal numbers from zero to 20, inclusive, the corresponding representations for othe decimal numbers being readily deducible from those shown. Each decimal digit is represented by four binary code elements, designated for convenience of reference as A, B, C, and D. As may be seen from the code configurations for the units digit, the configurations corresponding to the ten successive digit values recur in different order in adjacent decades. In the present illustrative code the order of occurrence of the code configurations in each decade is opposite to that in the adjacent decades. Hence, the configurations occur in one order when the preceding decimal digit (the decimal digit of next higher significance) is odd, and in the opposite order when the preceding decimal digit is even. For example, as will be seen from the table, the code configurations for the units digits 0, 1, 2, etc., are $xooo$, $xxoo$, $oxoo$, etc., respectively, when the preceding decimal digit is even, for example 0; but when the preceding decimal digit is odd, for example 1, those same code configurations represent the units digits 9, 8, 7, etc. It follows that the configuration corresponding to any digit value in the units column (for example) in one decade corresponds to the nine's complement of that value in the following or preceding decade.

*Table*

| Decimal number | Binary code representation | |
|---|---|---|
| | Tens ABCD | Units ABCD |
| 00 | xooo | xooo |
| 01 | xooo | xxoo |
| 02 | xooo | oxoo |
| 03 | xooo | oxxo |
| 04 | xooo | ooxo |
| 05 | xooo | ooxx |
| 06 | xooo | oxxx |
| 07 | xooo | oxox |
| 08 | xooo | xxox |
| 09 | xooo | xoox |
| 10 | xxoo | xoox |
| 11 | xxoo | xxox |
| 12 | xxoo | oxox |
| 13 | xxoo | oxxx |
| 14 | xxoo | ooxx |
| 15 | xxoo | ooxo |
| 16 | xxoo | oxxo |
| 17 | xxoo | oxoo |
| 18 | xxoo | xxoo |
| 19 | xxoo | xooo |
| 20 | oxoo | xooo |

An important feature of the code illustrated is that the configurations representing any digit value and its nine's complement differ only in the state of a single code element, designated D in the table. Codes having that property are thus illustrative of the general characteristic that the configurations representing the ten digit values in one decade may be transformed into the configurations representing those digit values in the following or preceding decade merely by inverting the state of (say) the D code element. A cyclic binary code of that type has the advantage that particularly simple and economical mechanism may be utilized to translate information from decimal form into binary coded decimal form. Fig. 4 represents an illustrative translator for that purpose, based on the particular code of the table. However, it will be understood that such a system may readily be modified to produce other cyclic binary codes having the characteristic property just described.

Fig. 2 includes in illustrative form a decimal keyboard, corresponding to keyboard 20 of Fig. 1, and including three banks 22, 23, and 24 of keys 21 corresponding to the units, tens and hundreds decimal digits, respectively; and translating means corresponding to translator 40 of Fig. 1, adapted to produce a binary code representation in accordance with the code of the table. The ten keys of each bank are denoted K0, K1 . . . K9, respectively, the numeral indicating the digit value to which the key corresponds. Each of the keys 21 acts when depressed to close a corresponding multiple pole switch S. The individual switches of each bank are distinguished as S0, S1 . . . S9, respectively. The several poles of each switch S are distinguished by adding an appropriate letter designation AC, B, D, or P to the switch designation already described, AC indicating the switch pole that controls the A or C code element; B and D indicating control of the B and D code elements, respectively; and P indicating a type of polarity control to be described, which is required only in the switch banks corresponding to a decimal digit of other than least significance. An advantage of the particular code shown in the table is that the A and C code elements are never both in state $x$ at the same time, so that a single pole in each switch can control both of those code elements. Some of the individual switch poles shown are not connected, and may therefore be omitted. However, in practice it is often more convenient to provide a uniform number of poles in all switches of a bank, merely leaving unconnected those that are not required. Thus, three poles are typically required in each switch for the decimal digit of least significance (the units digit in the present instance) and four poles are required for each of the remaining digits.

Each bank of keys and associated switches in Fig. 2 may be considered to represent any suitable type of switch mechanism, such, for example, as a rotary 10-position multiple-pole switch assembly, the ten positions corresponding to the respective values of the decimal digit. From that viewpoint, a decimal number may be represented by turning each of the switch assemblies to the position that corresponds to the desired digit value.

Main bus 48, which is preferably supplied with a voltage $E_2$ to be described, is connected directly to all switch armatures that control A, B, or C code elements, and also to the switch armatures that control the D code element for the decimal digit of greatest significance. For each of the code elements A, B, and C, and also for code element D in the digit of greatest significance, the corresponding output line 46 is connected to the appropriate contacts in all switches that correspond to digit values for which that code element is in condition $x$ according to the code of the table. However, the output line for the D code element of each digit of other than greatest significance is connected to the D contacts of all switches in the corresponding bank.

An even and an odd parity bus is provided for each of the banks, other than that for the decimal digit of least significance. The even parity busses for the tens and hundreds digits are shown at 41 and 42, respectively. Each is connected to the P contacts of all switches corresponding to even values of the digit in question. Similarly, the odd parity busses 43 and 44 are connected to all odd P switch contacts in the bank. Each parity bus of one bank is also connected to certain of the D armatures of the bank of next lower significance, the odd parity bus in the present instance being connected to the five armatures S0D through S4D and the even parity bus being connected to the five armatures S5D through S9D.

Thus, when any key in a particular bank is depressed, one or other of the parity busses for that digit is connected to main bus 48, depending upon the parity represented by the key. That selection of the parity bus for one digit partially determines the state of the D code element for the digit of next lower significance, that state depending also upon the selected value of that latter digit. For example, when the tens digit value is even, the D code element for the units digit (the decimal digit of next lower significance) is in state $o$ for values 0 through 4 and is in state $x$ for digit values 5 through 9; whereas those states are reversed when the tens digit value is odd. That result will be seen to agree with the code configurations of the table.

For many purposes, main bus 48 may be connected to ground rather than to voltage source $E_2$. The alternative states $o$ and $x$ of the code elements 46 then representing open circuit and grounded conditions, respectively.

Figs. 3 and 4 represent further details of an illustrative form of comparison circuit 50 in which each code element 36 is compared directly with the corresponding element 46 to produce a signal characteristic of the relationship between the states of the code elements of each such pair; and those signals are then supplied to a suitable discriminating circuit 50a. That discriminating circuit is capable of distinguishing between a condition in which all of the signals supplied to it correspond to like states of the respective two code elements and a condition in which one or more signals supplied to it correspond to unlike states of the corresponding two code elements.

As shown illustratively in Fig. 3, encoder 30 produces its code configuration on lines 36 by selectively closing certain of switches 37, which are connected between the respective lines 36 and a bus 38 which leads to a source of voltage designated as $E_1$. The switches 37 may be controlled, for example, by suitable cam structure driven with member 10, or may be considered to represent commutator contacts of the type already described. Similarly, translator 40 acts to close certain of switches 47, which are connected between the respective lines 46 and a bus 48 which leads to another source of voltage designated $E_2$. Switches 47 thus may correspond in simplified and somewhat schematic form to the switches S of Fig. 2. Voltage $E_1$ is different from $E_2$. Two voltages, such as $E_1$ and $E_2$, may differ either in magnitude or in polarity, or both. The two voltages are preferably, but not necessarily, of opposite polarity. That term is intended to include direct current voltages on opposite sides of a reference ground potential, and to include also alternating current voltages of opposite phase. Each line of group 36 and the corresponding line of group 46 are brought to a unit comparison circuit 72, which may typically comprise a conventional adding circuit, and which is represented schematically in Fig. 2 as a small circle. Output lines from the respective unit comparison circuits 72 are indicated at 76. An illustrative type of adding circuit 72 is shown schematically in Fig. 3, comprising adding resistors 73 and 74 in the respective input lines 36 and 46. The corresponding output line 76, as shown, is tied directly to the junction of the resistors, which may be considered an output terminal for the unit circuit. The output signal from such a comparison circuit 72 on the corresponding line 76 typically comprises a voltage that tends toward a definite value depending upon the actual states of the two corresponding code elements. If the corresponding switch 37 of encoder 30 is closed and the corresponding switch 47 of translator 40 is open, then the output line 76 will carry a voltage that tends to equal $E_1$. Similarly, if switch 37 is open and switch 47 is closed, the output voltage will tend to equal $E_2$. On the other hand, if switches 37 and 47 are both closed, so that both code elements are in the same state, then the output line 76 will typically receive a voltage that tends to equal some intermediate voltage $E_0$ between $E_1$ and $E_2$, the exact value of $E_0$ depending upon the detailed structure of comparison circuit 72. In preferred form of the invention, $E_1$ and $E_2$ are direct current voltages of equal magnitude and opposite polarity, and adding circuits 72 are symmetrical, so that $E_0$ is zero. If both code elements are in the same state, but with switches 37 and 47 both open, then the output signal on line 76 typically represents an open circuit condition, which may be considered for many purposes the equivalent of the presence of the voltage $E_0$.

Discriminating circuit 50a typically comprises two output lines 53 and 54, one of which is connected to each of the signal lines 76 via a rectifying device that permits current flow substantially only in one direction, for example from the signal line to output line 53; and the other of which is connected to each of the signal lines 76 via a rectifying device that permits current flow substantially only in the other direction, for example from output line 54 to the signal line. An illustrative circuit of that type is shown schematically in Fig. 3. The rectifying devices connected between the respective input line 76 and output line 53 are indicated in schematic form at 81; those connecting the input lines with output line 54 are similarly indicated at 82. A stabilizing network is preferably connected between the lines 53 and 54, being shown as two series-connected resistors 84 and 85. Those resistors are preferably of equal value and have their junction 86 tied as indicated to a source of voltage corresponding to $E_0$, already described. If $E_0$ is substantially ground potential, as is true when $E_1$ and $E_2$ have equal magnitudes and opposite polarities, as is preferred, then junction 86 may be directly grounded.

With a discriminating circuit of the described type, if all signal lines 76 are either in open circuit condition or carry the intermediate voltage $E_0$, lines 53 and 54 tend to be maintained at that same potential. On the other hand, if one of the signal lines 76 is connected via its adding circuit 72 to either the voltage $E_1$ or $E_2$ but not to the other, then the potential of one of the output lines 53 or 54 is higher than the other. With the rectifying devices oriented as typically described and shown, that potential difference is in a direction to make line 53 more positive than line 54. That difference in potential may be utilized in any convenient manner in control circuit 60 to indicate the fact that the code configurations on lines 36 and that on lines 46 are unlike. For example, control circuit 60 may include a sensitive relay having the relay coil connected directly between lines 53 and 54, and having a normally open relay switch connected in series with the circuit through which power is supplied to motor 12. Then, so long as current flows through the relay coil between lines 53 and 54 the motor circuit remains closed. But the relay is deactuated and the motor circuit is opened (and may be held open by any suitable known means) whenever the potential difference between lines 53 and 54 becomes substantially zero in response to identity of the two code configurations.

An illustrative control circuit 60 of more convenient type is shown illustratively in Fig. 3. As there shown, motor circuit 62 includes in series the back (normally closed) contact 63 of relay 64. The coil of that relay is not connected directly between lines 53 and 54, but is controlled from those lines via a gas tube 66, which may be of thyratron type and which acts as a switching tube. The plate circuit of tube 66 includes in series the relay coil, a source of voltage, shown schematically as the battery 67, and a control switch 68 which is normally closed but may be momentarily opened, as by manually pressing a spring-returned button 68a. A capacitor 65 and a resistor 65a may be connected in shunt to the relay winding to compensate its inductance. Lines 53 and 54 are connected, respectively, directly to the cathode and via the protective resistor 69 to the control grid of tube 66.

In operation of the illustrative control circuit, momentary depression of button 68a opens the plate circuit of tube 66, extinguishing the tube if it was conducting, and deactuating relay 64. Power is thereby applied via relay contact 63 and lines 62 to motor 12, driving member 10 through its range of positions. So long as the code configurations on lines 36 and 46 are unlike, line 54 is held negative with respect to line 53 by a definite voltage sufficient to prevent firing of gas tube 66. Under that condition, tube 66 remains non-conductive, with the relay deactuated as shown. When member 10 enters the position region that corresponds to the number designated at keyboard 20, the code configuration on lines 36 become (at least momentarily) identical with that on lines 46. All pairs of corresponding lines then either are both open or are connected one to $E_1$ and the other to $E_2$. All lines 76 are thereby brought to the common voltage $E_0$, firing tube 66. Relay 64 is thereby actuated, deleting power from motor 12 and preferably applying suitable braking means to stop it substantially immediately. The motor-driven member is thus stopped at a position corresponding to that set up on keyboard 20.

I claim:

1. Means for producing a cyclic binary coded decimal representation of an Arabic number that includes at least a first decimal digit and a second decimal digit of next lower significance, said means comprising first and second switch control means corresponding to the respective digits, each switch control means being capable of a plurality of positions corresponding to the respective alternative values of the corresponding digit, a plurality of output lines for each digit, a main bus, and switching means for the output lines acting in response to each set of positions of the two switch control means to connect selected ones of the output lines to the main bus in accordance with a predetermined cyclic code, said switching means including an even parity bus and an odd parity bus for the first digit, parity switching means for the even parity bus acting to connect that bus to the main bus in response to any position of the first switch control means that corresponds to an even digit value, parity switching means for the odd parity bus acting to connect that bus to the main bus in response to any position of the first switch control means that corresponds to an odd digit value, and output switching means for one of the output lines for the second digit acting in response to the position of the switch control means that corresponds to the value zero for that digit to connect said one output line to one parity bus, and acting in response to the position of the switch control means that corresponds to the value nine for that digit to connect said one line to the other parity bus.

2. Means for producing a cyclic binary coded decimal representation of an Arabic number that includes at least a first decimal digit and a second decimal digit of next lower significance, said means comprising first and second switch control means corresponding to the respective digits, each switch control means being capable of a plurality of positions corresponding to the respective alternative values of the corresponding digit, a plurality of output lines for each digit, a main bus, and switching means for the output lines acting in response to each set of positions of the two switch control means to connect selected ones of the output lines to the main bus in accordance with a predetermined cyclic code, said switching means including an even parity bus and an odd parity bus for the first digit, parity switching means for the even parity bus acting to connect that bus to the main bus in response to any position of the first switch control means that corresponds to an even digit value, parity switching means for the odd parity bus acting to connect that bus to the main bus in response to any position of the first switch control means that corresponds to an odd digit value, and output switching means for one of the output lines for the second digit acting to connect that one output line to one parity bus in response to any position of the switch control means that corresponds to a value for the second digit between zero and four inclusive, and acting to connect that one output line to the other parity bus in response to any position of the switch control means that corresponds to a value for the second digit between five and nine inclusive.

References Cited in the file of this patent

UNITED STATES PATENTS

| | | |
|---|---|---|
| 2,074,392 | Herbst | Mar. 23, 1937 |
| 2,476,673 | May et al. | July 19, 1949 |
| 2,576,099 | Bray et al. | Nov. 27, 1951 |
| 2,630,562 | Johnson | Mar. 3, 1953 |
| 2,641,696 | Woolard | June 9, 1953 |
| 2,679,644 | Lippel | May 25, 1954 |
| 2,700,756 | Estrems | Jan. 25, 1955 |

FOREIGN PATENTS

| | | |
|---|---|---|
| 730,854 | Great Britain | June 1, 1955 |

UNITED STATES PATENT OFFICE
CERTIFICATE OF CORRECTION

Patent No. 2,909,769                                            October 20, 1959

Carl P. Spaulding

It is hereby certified that error appears in the printed specification of the above numbered patent requiring correction and that the said Letters Patent should read as corrected below.

Column 2, line 72, for "internal number" read -- integral number --; column 4, line 26, for "othe" read -- other --.

Signed and sealed this 26th day of April 1960.

(SEAL)
Attest:

KARL H. AXLINE
Attesting Officer

ROBERT C. WATSON
Commissioner of Patents